Patented Apr. 1, 1952

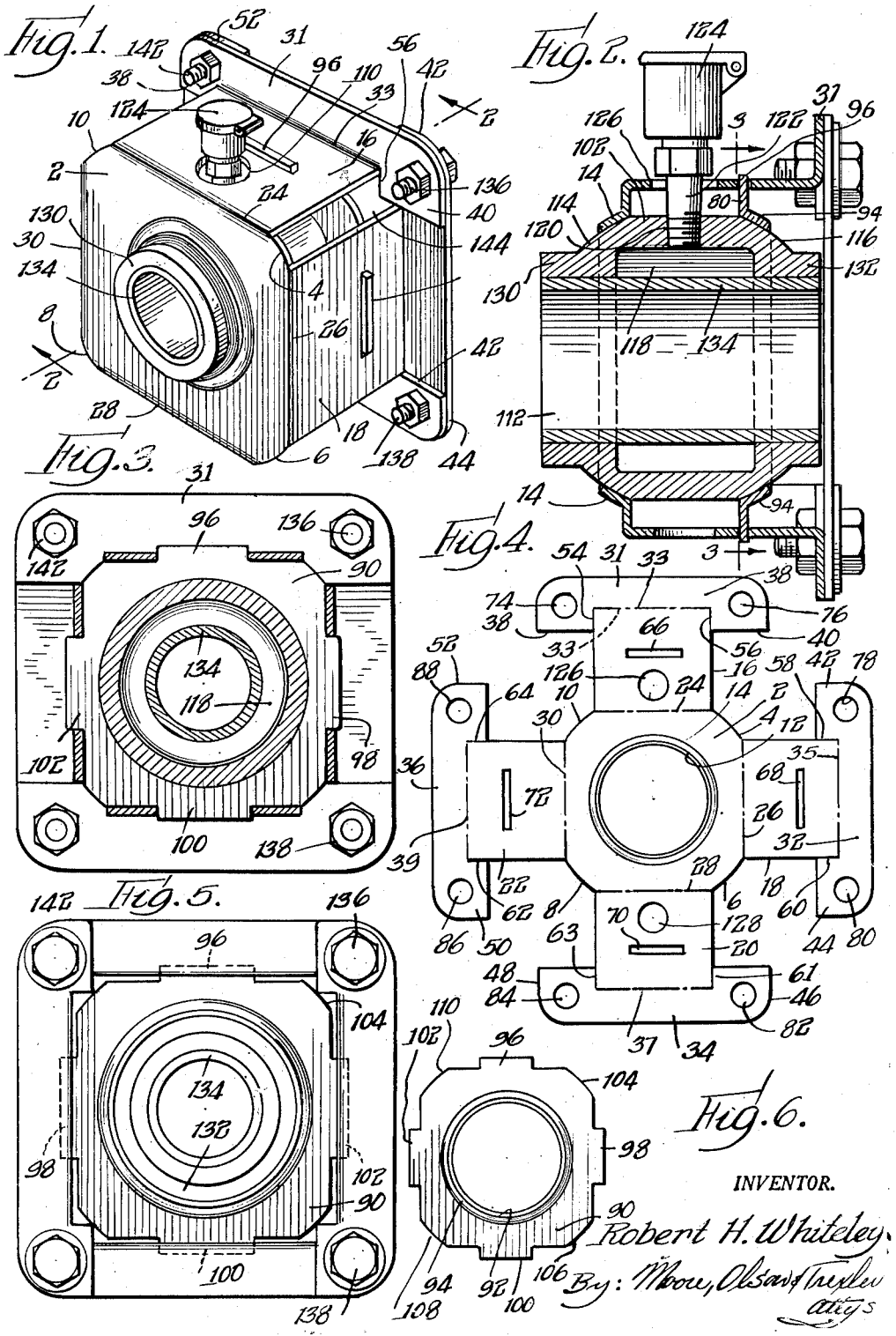

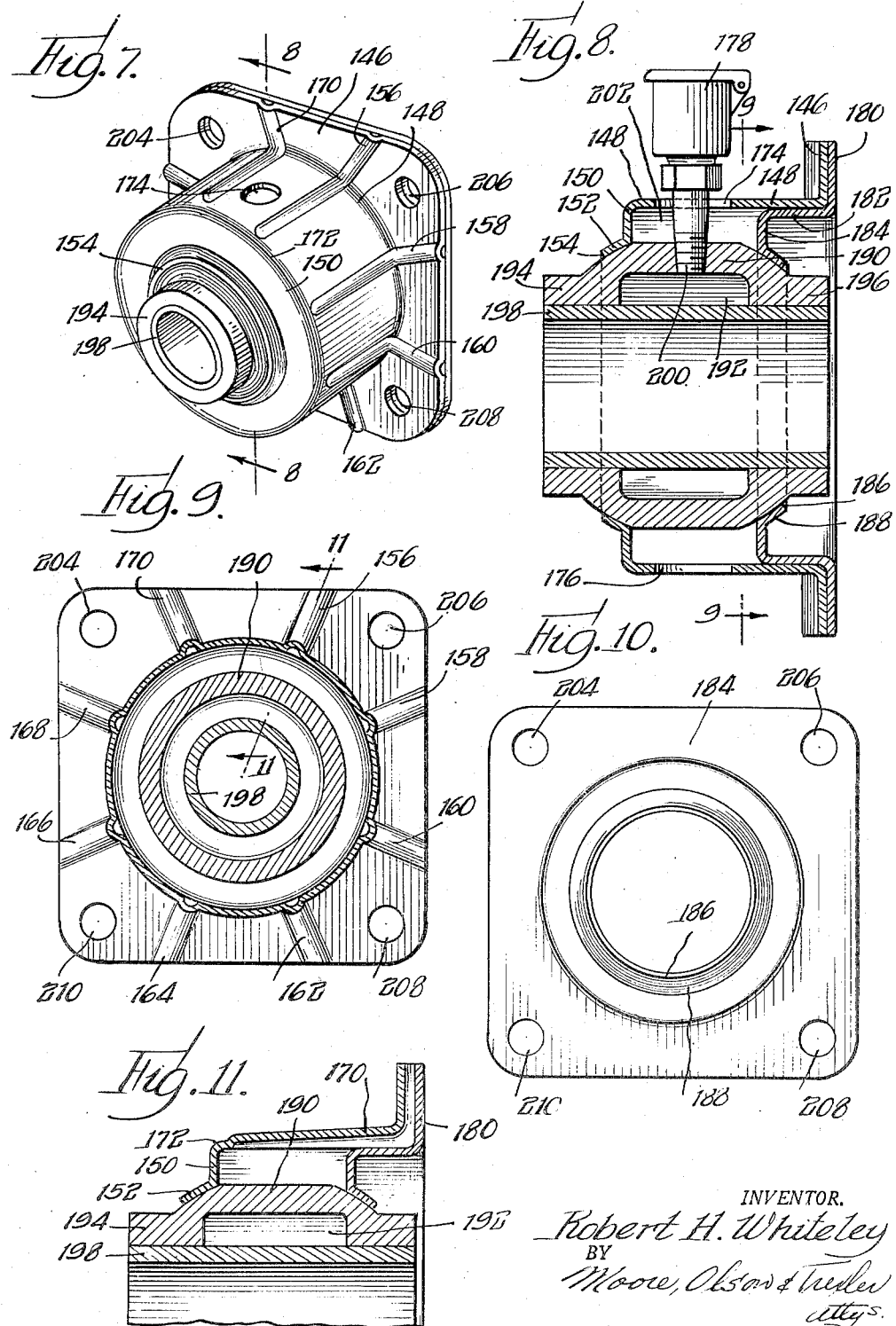

2,591,221

UNITED STATES PATENT OFFICE 2,591,221

SIDE MOUNT PILLOW BLOCK BEARING

Robert H. Whiteley, Chicago, Ill., assignor to Randall Graphite Products Corporation, Chicago, Ill., a corporation of Delaware Application July 3, 1946, Serial No. 681,195

20 Claims. (Cl. 308—72)

This invention relates to pillow block bearings, and more particularly to a side mount pillow block bearing.

Among the objects of the present invention is to provide a bearing of the foregoing character which comprises a multipart sheet metal housing enclosing and supporting a spherical or ball member which in turn is adapted to receive a grooved lubricating sleeve or a ball bearing sleeve for rotatably supporting a shaft.

It is a further object of the invention to provide a side mount pillow block construction having a sheet steel housing member constructed of two sheet steel stampings each having an opening bordered by a curved flanged portion which portions are adapted to engage spaced curved walls of the bearing carrying member or sleeve for holding the latter in self-aligning position, and wherein the two sheet steel housings are constructed and arranged not only for simplicity in manufacture and facility and economy in assembly, but also wherein means is associated with the housing for holding the two members thereof in interlocked assembled self-aligning relation about the bearing sleeve carrying member.

Yet another object of the invention resides in providing a sheet metal side mount pillow block bearing comprising two sheet metal housing members enclosing the self-aligning bearing sleeve carrier and wherein the sheet metal housing sections are formed with contacting flanges and wherein at least one of the sections is provided with a more or less box-like, laterally extending, integral portion having a flanged opening corresponding with a flanged opening in the other section of the housing adapted to contact curved portions of the bearing sleeve carrier therebetween with cylindrical ends of the carrier extending through said openings whereby to house the carrier and bearing sleeve in a manner to permit self-alignment of the bearing carrier.

Yet another object of the invention in connection with the foregoing resides in providing one of the sheet metal sections carrying the cylindrical portion with integral ribbed portions both on the flanged part and on the integral cylindrical part to rigidify the structure.

Yet another object of the invention is to provide a pillow block bearing formed of two sheet metal casing members having portions constructed and arranged to receive a self-aligning bearing member therebetween and wherein the casing members are constructed and arranged to be bent into assembled interlocked relation about and enclosing the ball member during their assembly about and enclosing the self-aligning bearing member.

Yet another object of the invention resides in providing a multisectional sheet metal side mount pillow block bearing of simple construction and assembly, for housing a bearing sleeve in a self-aligning manner, wherein one of the sections is formed as a substantial box-like housing having an end wall apertured and formed with a surrounding flange curved in cross section to contact with a similar curved wall of the inner sleeve-carrying bearing member, and wherein the other housing section nests within and closes the open end of the first section, said second section having a registering aperture and similarly curved flange for contacting another curved wall of the bearing sleeve-carrying member, whereby to permit alignment of the bearing sleeve in the housing, there being means for holding the internesting housing sections in assembed position.

Yet another object of the invention is to provide a sheet steel pillow block bearing composed of two sheet steel blanks having completal interengageable slots and tongues adapted to interlock when said blanks are interfolded about the bearing member whereby to form a sheet steel housing for enclosing the bearing in a self-aligning manner.

These and other objects of the invention will be apparent from a perusal of the following specification when taken in connection with the accompanying drawings, wherein:

Figure 1 is a perspective view of one form of the sheet steel pillow block;

Figure 2 is a sectional view taken on the line 2—2 of Figure 1;

Figure 3 is a section taken on the line 3—3 of Figure 2;

Figure 4 is a view of one of the sheet steel blanks before bending;

Figure 5 is a rear view of the device of Figure 1;

Figure 6 is a view of the other blank;

Figure 7 is a modified construction;

Figure 8 is a view taken on the line 8—8 of Figure 7;

Figure 9 is a view taken on the line 9—9 of Figure 8;

Figure 10 is an end view of the right-hand side of Figure 8; and

Figure 11 is a view taken on the line 11—11 of Figure 9.

Referring now to the drawings in detail, Figures 1 to 6 inclusive illustrate one of the forms of the invention, which comprises a pair of sheet metal, preferably sheet steel, sections, the first of which is shown in Figure 4. This section comprises a generally rectangular, central hub-like portion 2 which at the corners is rounded as at 4, 6, 8 and 10. This hub-like portion 2 has a central opening 12 bordered by a laterally bent, partly spherical flange 14 which is formed as a section of a cone, as shown clearly in Figure 2, for a purpose hereinafter set forth. Extending outwardly from the hub-like portion 2 are four radially disposed, reatively wide tongues 16, 18, 20, and 22. The width of the tongue is substantially equal to the width of each side of the hub except for the portion occupied by the curved corner portions 4, 6, 8 and 10. In short, the sides 24, 26, 28 and 30, which are shown by the corresponding inner fold lines 24, 26, 28 and 30 in Figures 1 and 4, are substantially coextensive with the width of the box-like portion of the bearing as seen in Figure 1. The outer ends of the tongues proper 16, 18, 20 and 22 extend to the outer fold lines 33, 35, 37, and 39, and beyond these fold lines there is an integral head for each one of these tongues. These heads are shown at 31, 32, 34 and 36 as extending outwardly on opposite sides of the tongues as at 38, 40, 42, 44, 46, 48, 50 and 52. Each of the tongues is formed with a slit such as 54, 56, 58, 60, 61, 63, 62 and 64 in the metal of the head, which slits extend from the underside lines of the shouldered portions of the head up to the fold lines. Each tongue is provided with a relatively wide slot such as 66, 68, 70 and 72, and each shouldered head 31, 32, 34 and 36 is provided with a pair of fastener receiving perforations or openings 74, 76, 78, 80, 82, 84, 86 and 88, each perforation being located at the outer ends of these shouldered heads between the curved outer wall of the shouldered head and the parallel marginal edges of the tongues 16, 18, 20 and 22.

The other complemental blank which is to form the sheet metal housing is shown in front elevation in Figure 6. It comprises an integral flat sheet steel blank body portion 90 which likewise has a central, relatively large opening 92 surrounded by a partly spherical flange 94 likewise of conical or curved configuration, as shown in Figure 2. This body portion 90 is provided with four substantially radially disposed, relatively short tongues 96, 98, 100 and 102. The blank 90 is cut away diagonally at the corners as at 104, 106, 108 and 110. The width of the tongues, such as 96, is slightly less than the width of the slots 66, 68, 70 and 72, whereby the tongues project in one position through these slots, when the two pieces are interlocked, to provide a closed housing, see Figure 1. The remaining portion of the side mount pillow block comprises the bearing sleeve 102 which in cross section, as shown in Figure 2, is provided with the substantially circular portion 114—116. In addition, this ball-shaped bearing is cut away interiorly as at 118 to provide an oil reservoir and an adjoining opening 120 which is threaded to receive the threaded shank 122 of an oil cup 124. In addition, one, and preferably two, of the wall portions such as 16 and 20, see Figure 4, are provided with openings 126 and 128 through which the shank 122 of the oil cup passes, as shown in Figures 1 and 2. The spherical portion 114—116 of the bearing interiorly is provided with the spaced apart cylindrical flanges 130 and 132 to receive a graphite bronze type of sleeve or a ball bearing type of sleeve 134, the construction of the sleeve being illustrated in my prior Patent 2,067,034 of January 5, 1937, or it may be of the construction shown in my prior Patent 2,123,872 of July 19, 1938.

In forming the two blanks shown in Figures 4 and 6 into the ultimate housing shown in the remaining figures it is to be understood that the spherical bearing carrying the bearing sleeve is inserted into position so that the spherical portion 114—116 lies between the two blanks 14 and 94 so that the partly spherical flanges of these two blanks overlie the spherical surface of the substantially spherical bearing portion 114—116. The sheet metal tongues 16, 18, 20 and 22 are bent about the fold lines 24, 26, 28 and 30, being assisted by a forming device, and are thus bent rearwardly and also during this bending operation the heads 31, 32, 34 and 36 are bent about the lines 33, 35, 37 and 39 so that the heads 31, 32, 34 and 36 will lie at right angles to the tongue portions 16, 18, 20 and 22, as shown clearly in Figure 1. During this bending of the heads 31, 32, 34 and 36 about these fold lines 33, 35, 37 and 39, the slitted lines 54, 56, 58, 60, 61, 63, 62 and 64 will extend downwardly below the parallel edges of the tongue portions 16, 18, 20 and 22 as shown in Figure 1, whereby the bottom edges of the outwardly extending shouldered portions 38, 40, 42, 44, 46, 48, 50 and 52 will extend downwardly as at 40 and upwardly as at 42, see Figure 1, below and above the fold lines 33 and 37. Thus when each one of these heads 31, 32, 34 and 36 is folded in the manner indicated there will be provided at the corners double thicknesses of metal occasioned by the overlapping of these shouldered tabs 38, 40, 42, 46, 48, 50 and 52 so that the perforations 74, 76, 78, 80, 82, 84, 86 and 88 formed in these projecting tabs will register to receive two fastening members such as the threaded bolts 136, 138, 140 and 142, 140 not being shown. These bolts receive the nuts to hold these shouldered flanges 38, 40, 42, 44, 46, 48, 50 and 52 securely together. As shown in Figure 1, the inner corner portion of the shoulder formed by the split line 56 will lie in the space or gap 144 formed by the confronting spaced edges of the tongues 16 and 18, there being four of these gaps like 144, each one of which receives the overlapping inner edges of the heads of the tongues formed by the split portions 54, 56, 58, 60, 61, 63, 62 and 64, whereby a substantially rectangular, square or box-like housing of sheet metal is ruggedly and rigidly formed. By means of this construction, and particularly by means of the partly spherical flanges 14 and 94, the spherical bearing surfaces 114 and 116 carrying the graphite bronze bearing sleeve 134 may align itself in this sheet metal housing. It will be apparent that I have thus formed a simple, rugged, and easy to manufacture and assemble side mount pillow block bearing. It is formed of two pieces of sheet metal suitably blanked out by means of a simple punching operation and assembled in a very simple type of forming machine which permits the two blanks to be inserted therein with the ball-shaped bearing therebetween, and by a simultaneous motion they are properly bent together and interfolded so that the tongues 96, 98, 100 and 102 of the blank shown in Figure 6 will pass through the slots 66, 68, 70 and 72, and wherein the shouldered heads are folded into interlapping relation with the apertures thereof registering so that bolts may be passed therethrough and held in position by nuts screwing upon the bolts.

In Figures 7 to 11 of the drawings I have shown a very simple type of modified construction of two sheet metal sections comprising a first sheet metal section shown in perspective in Figure 7 and in cross section in Figure 8. This first section comprises a substantially flat, skirt-like portion 146 suitably shaped or formed outwardly to provide an integral, cylindrical, laterally extending barrel or hub 148 which projects forwardly of the plane of the flange or skirt portion 146 a considerable distance, where it is provided with a depending flange 150 extending normally to the surface of the cylindrical periphery 148. This flange in turn terminates in a partly spherical circular flange 152 which has some resiliency thereby to provide an opening 154. Spaced apart integral struck-up ribs 156, 158, 160, 162, 164, 166, 168 and 170 are provided for this sheet metal piece. These ribs extend from the outermost edge of the flange portion 146 substantially to the junction 172 of the cylindrical portion 148 and the downwardly extending flange portion 150, thereby lending considerable ruggedness and rigidity to this section. In addition, the cylindrical portion 148 is provided with an opening 174 and yet another opening 176 for the reception of an oil cup such as 178 shown in Figure 8.

The other sheet metal section of the housing comprises a blank which has a flange 180 that is complemental to the flange 146. It is shown in Figure 8 as being a little longer than flange 146 so as to bend around and underlie the underside of the cylindrical projection 148. This bent around portion of the second section is shown at 182 and it is bent at right angles to the flange portion 180. At its outer end it is again bent at right angles as at 184 and is provided with an opening 186 surrounded by a partly spherical flange 188. By having the flange 180 abut the face of the flange 146, the flange 188 is suitably spaced from the flange 152 of the first section, and these two circular flanges 152 and 188 thus provide spaced spherical flanges to receive the spherical, substantially ball-shaped reservoir or other member 190 which is shown as provided with a cylindrical internal cutaway portion 192 to hold lubricant, and as provided with outwardly extending circular flanges 194 and 196 which flanges receive a graphite bronze bearing sleeve 198. The bearing portion 190 is provided with the threaded aperture 200 to receive the shank 202 of the oil cup 178. The graphite sleeve 198 is either a ball bearing type of sleeve or the graphite bronze bearing type of sleeve, as hereinbefore described in connection with the sleeve 134 of the prior figures. The two flanges 146, 180 are provided with registering fastener openings 204, 206, 208 and 210 which when in registration as shown in Figures 7 and 8, are adapted to receive fastening bolts and nuts and other fastening members, whereby not only securely to clamp the two housing members about the spherical bearing member 190 but also to secure the steel housing pillow block to its side support, and whereby the spherical bearing sleeve 190 may itself align itself with respect to the flange portions 152 and 188 of the two sectional housing pieces which enclose the bearing member.

Obviously the invention is not limited to the specific details of construction disclosed herein but is capable of other modifications and changes without departing from the spirit and scope of the appended claims.

Having thus described the invention, what is claimed as new and desired to be secured by Letters Patent is:

1. A shaft bearing comprising a housing formed of a first and a second sheet metal section, said first sheet metal housing section having a flange and an integral hollow housing projecting laterally therefrom and bent substantially at right angles to the plane of said flange, said laterally projecting housing portion having a front wall disposed substantially parallel to the plane of the flange, said front wall having a central opening for the shaft, said opening having a concentrically surrounding, somewhat spherically shaped, forwardly projecting flange formed integral with said front wall, said second sheet metal housing section including a flanged portion, said flanged portion having a central opening, said flanged portion being formed as a concentrically surrounding, partly spherical, rearwardly projecting flange, a bearing sleeve carrier having external, spaced, spherical shaped external wall surfaces engaged by the spherical flange portions of said first and second housing sections, said bearing carrier having sleeve-like portions passing through the registering openings of said first and second housing sections, a bearing sleeve carried by said carrier, means for holding said housing sections in an interengaged, assembled relation with said bearing carrier therebetween while permitting said bearing carrier to self-align by relative movement of the external spherical surfaces of said bearing carrier and the spaced spherical flanges of said housing sections, and lubricating means having means forming a filling opening disposed exterior of said housing portion, said lubricating means having a lubricant conduit passing through the exterior wall of said laterally projecting housing portion and through the wall of said sleeve carrier to lubricate the bearing formed by said sleeve.

2. In a bearing, in combination with a bearing member provided with spaced, curved, external bearing aligning surfaces, a pair of sheet metal housing members for enclosing said bearing member, one of said housing members comprising a flange portion and an integral, laterally extending, box-like housing provided with an integral end wall formed with a central opening and a surrounding, partly spherical flange adapted to contact one of the curved external bearing aligning surfaces of said bearing member, said laterally projecting box-like portion having opposed pairs of slots in its side walls, the other sheet metal housing member having a central aperture registering with the central aperture of the first member and bordered by a laterally extending flange contactingly overlying the other spaced external curved bearing aligning surfaces of said bearing member, said second section having projecting tongues adapted to lie in the slots of said box-like member, and means for holding said sections in assembled relation with the spherical flanges thereof contacting the curved bearing aligning surfaces of the bearing member therebetween while permitting said bearing member to align itself with respect to said assembled housing members.

3. In a bearing, in combination with a bearing member provided with spaced, curved, external walls, a pair of sheet metal housing members, the first sheet metal housing member comprising a substantially box-like body having four side walls the confronting parallel edges of which are spaced apart at their corners to provide corner openings, said side walls having a front wall integral with all of said side walls, said front wall having a central aperture and a forwardly extending flange adapted to contact one of the spaced external curved walls of said bearing member, said side walls being slotted, the second sheet metal housing member comprising a substantially flat body portion of a size to fit within the side walls of said first housing member, said flat body portion having a central aperture registering with the aperture in the front wall of the first mentioned housing member and having a surrounding, substantially spherical flange adapted grippingly to overlie the other spaced external curved wall of said bearing member and said flat body portion of said second housing member having a series of radially extending tongues adapted to project into the slots of the side walls of said first mentioned sheet metal housing member, each of said side walls of said first mentioned housing member having integral, normally projecting flanges, each of said flanges at its ends having a laterally extending shoulder, said laterally extending shoulders at the ends of all of said flanges, overlapping in pairs to provide a double thickness, said overlying flanges having registering fastener receiving openings, fastening means passing through said openings, the inner portions of said overlapping double thickness shoulders lying in the spaces formed at the corners between the parallel edges of the sides of said box-like structure.

4. In a bearing, in combination with a bearing member having spaced, curved external bearing aligning surfaces, a pair of sheet metal housing members enclosing said bearing member, one of said housing members comprising a substantially square front plate having a central opening, the front of the plate about said opening comprising a flange circumferentially surrounding said opening, said flange in cross section including a curved surface adapted to overlie and engage one of the curved external bearing aligning surfaces of the bearing member, said front plate having four side plates integrally extending therefrom, said side plates being disposed in pairs in parallel relation to comprise a box-like structure, said side plates being of less width than the side dimensions of the substantially square front plate so as to provide, at the corners of the front plate and the housing, elongated openings, each of said side plates terminating in an upstanding flange extending at right angles to said side plate, the opposite ends of said upstanding flange being formed with shoulder portions projecting substantially inwardly of each flange beyond the junction of the side plates and the flange, the projecting portions at the ends of each flange of the four side plates overlapping to provide portions of double thickness, and the corner portions of said overlapping portions of the side plates projecting into the corner spaces between the sides of said box-like structure, said overlapping portions having registering apertures and fastening means passing therethrough, said four side plates each including an opening therein, and a sheet metal plate of dimensions to fit within the end of said box-like structure, said plate having projections to engage in the perforations of said side plates to hold said sheet metal plate in position within the confines of said box-like structure enclosing the rear thereof, said sheet metal plate having an opening registering with the opening in the front plate of said box-like structure, said sheet metal plate having a rearwardly, integrally formed flange thereon concentrically surrounding said opening, the cross section of said flange including a curved portion adapted contactingly to overlie the other curved external bearing aligning surface of the bearing member, a bearing sleeve carried by said bearing member.

5. In a bearing, in combination with a bearing member provided with spaced, curved, external bearing aligning surfaces, a pair of sheet metal housing members for enclosing said bearing members, one of said members comprising a box-like housing of sheet metal, said box-like housing being open in the back and having a front wall, said front wall having a bearing opening centrally thereof, said front wall about said bearing having a forwardly extending flange, the inner wall of which is curved in cross section and contactingly overlies one of the curved external bearing aligning surfaces of the bearing member with the bearing projecting forwardly therethrough, the other of said housing members comprising a sheet metal plate closing the rear of said box-like structure and having a similarly formed registering opening and a similarly formed flange extending rearwardly and engaging the other external bearing aligning surface whereby to permit alignment of said bearing member with respect to said housing member, and means for detachably interconnecting said sections of said box-like structure.

6. In a bearing, in combination with a bearing member provided with spaced, curved, external bearing aligning surfaces, a pair of sheet metal housing members for enclosing said bearing members, one of said members comprising a box-like housing of sheet metal, said box-like housing being open in the back and having a front wall, said front wall having a bearing opening centrally thereof, said front wall about said bearing having a forwardly extending flange which is curved in cross section and contactingly overlies one of the curved external bearing aligning surfaces of the bearing member with the bearing projecting forwardly therethrough, and a sheet metal plate closing the rear of said box-like structure and having a similarly formed registering opening and a similarly formed flange extending rearwardly and engaging the other external bearing aligning surface whereby to permit alignment of said bearing member with respect to said housing member, the sides of said box-like housing being slotted and said plate having outwardly projecting tongues engaging in said slots.

7. In a bearing, in combination with a bearing member provided with spaced, curved, external bearing aligning surfaces, a pair of sheet metal housing members for enclosing said bearing member, one of said housing members comprising a substantially rectangular flange having its central portion formed outwardly laterally to provide a substantially cylindrical, relatively deep hub, said hub including at its front and in spaced relation from the flange, an inwardly extending peripheral flange terminating in a more forwardly projecting annular flange, the inner surface of which is slightly curved and is adapted to overlyingly contact one of the external bearing aligning surfaces of said bearing, said flange and integral cylindrical portion thereof having formed externally thereof a series of continuous ribs disposed therearound in spaced relation, said ribs extending from the flange continuously forwardly and along at least a portion of the cylindrical member to strengthen and rigidify the same, the other of said sheet metal housing members comprising a flange portion of substantially the cross sectional shape and size of the flange of said first mentioned housing member and having forwardly projecting walls adapted to telescope within the forwardly projecting cylindrical housing of said first mentioned housing member, said second mentioned forwardly extending walls having integral flanges extending inwardly and terminating in additional depending flanges, the inner surfaces of which are curved and which flanged surfaces are adapted to engage the other external bearing aligning surfaces of the bearing member, said first mentioned flanges of both of said housing members being formed with registering perforations for the reception of fastening members for holding said flanges together.

8. In a bearing, in combination with a bearing member provided with spaced, curved, external bearing aligning surfaces, a pair of sheet metal housing members for enclosing said bearing member, one of said housing members comprising a substantially rectangular flange having its central portion formed outwardly laterally to provide a substantially cylindrical, relatively deep hub, said hub including at its front and in spaced relation from the flange, an inwardly extending peripheral flange terminating in a more forwardly projecting annular flange, the inner surface of which is slightly curved and is adapted to overlyingly contact one of the external bearing aligning surfaces of said bearing, said other sheet metal housing member comprising a flange of substantially the cross sectional shape and size of the flange of said first mentioned housing member and having integral forwardly projecting walls adapted to telescope within the forwardly projecting cylindrical housing of said first mentioned housing member, said second mentioned forwardly extending walls having integral flanges extending inwardly and terminating in additional depending flanges which are curved and which flanged surfaces are adapted to engage the other external bearing aligning surfaces of the bearing member, said first mentioned flanges of both of said housing members being formed with registering perforations for the reception of fastening members for holding said flanges together.

9. In a bearing, in combination with a bearing member provided with spaced, curved, external bearing aligning surfaces and a lubricant conduit, a pair of sheet metal housing members for enclosing said bearing members, one of said members comprising a box-like housing of sheet metal, said box-like housing having an aperture formed in at least one side thereof to receive said lubricant conduit, said box-like housing being open in the back and having a front wall, said front wall having a bearing opening centrally thereof, said front wall about said bearing opening having a forwardly extending flange, which is curved in cross section and contactingly overlies one of the curved external bearing aligning surfaces of the bearing member with the bearing member projecting forwardly therethrough, and a sheet metal plate closing the rear of said box-like structure and having a similarly formed registering opening and a similarly formed flange extending rearwardly and engaging the other external bearing aligning surface whereby to permit alignment of said bearing member with respect to said housing member, and means formed at the corners of said box-like structure for detachably holding the same in assembled housing position about said bearing member.

10. In a bearing, in combination with a bearing member provided with spaced, curved, external bearing aligning surfaces, a pair of sheet metal housing members for enclosing said bearing member, one of said housing members comprising a substantially rectangular flange having its central portion formed outwardly laterally to provide a substantially cylindrical, relatively deep hub, said hub including at its front and in spaced relation from the flange, an inwardly extending peripheral flange terminating in a more forwardly projecting annular flange, the inner surface of which is slightly curved and is adapted to overlyingly contact one of the external bearing aligning surfaces of said bearing, said other sheet metal housing member comprising a flange of substantially the cross sectional shape and size of the flange of said first mentioned housing member and having integral, forwardly projecting walls adapted to telescope within the forwardly projecting cylindrical housing of said first mentioned housing member, said second mentioned forwardly extending walls having integral flanges extending inwardly and terminating in additional depending flanges which are curved and which flanged surfaces are adapted to engage the other external bearing aligning surfaces of the bearing member, said first mentioned flanges of both of said housing members being formed with registering perforations for the reception of fastening members for holding said flanges together, the cylindrical portion of said first mentioned flange having an opening in its uppermost surface, said bearing having an opening registering with said last mentioned opening, both of said registering openings being adapted to receive the shank of an oil cup.

11. In a bearing, in combination with a bearing member provided with spaced, curved, external bearing aligning surfaces, a pair of sheet metal housing members for enclosing said bearing members, each including an outstanding flanged portion and each having a laterally extending portion, one of said laterally extending portions telescoping within the laterally extending portion of the other housing section with the flanged portions of the two sections lying one against the other, said laterally extending portions having registering openings to permit opposite ends of the bearing member to project therethrough, and each of said openings being bordered by a curved flange whereby said curved flanges are maintained in spaced relation in overlapping contacting position on the spaced, curved external bearing aligning surfaces of the bearing member, and means for interconnecting said flanged portions of said housing sections to maintain the same in assembled relation with the bearing member therebetween.

12. A housing for a bearing member provided with spaced, curved, external bearing aligning surfaces and a lubricant conduit connecting therewith comprising a pair of housing members for enclosing said bearing member, one of said housing members including a flange portion and a hollow housing portion projecting laterally therefrom and having walls disposed substantially at right angles to the plane of said flange portion, at least one of said walls having an aperture therein to receive said lubricant conduit, a front wall for said housing portion disposed substantially parallel to the plane of said flange, said front wall having an opening formed therein, a partly spherical flange surrounding said opening and being adapted to contact one of the curved bearing aligning surfaces of said bearing member, said second housing member including a wall portion disposed substantially parallel to the front wall of said first housing member, said wall portion having an aperture formed therein, a laterally extending partly spherical flange surrounding said aperture and being adapted to contact the other spaced external curved bearing aligning surface of said bearing member, and means for connecting said second housing member to said first housing member.

13. A housing for a bearing member provided with spaced, curved, external bearing aligning surfaces and a lubricant conduit connecting therewith comprising a pair of sheet metal housing members for enclosing said bearing member, one of said housing members including a flange portion and an integral hollow housing portion projecting laterally therefrom and having walls disposed substantially at right angles to the plane of said flange portion, at least one of said walls having an aperture therein to receive said lubricant conduit, a front wall for said housing portion integral with said first mentioned walls and disposed substantially parallel to the plane of said flange, said front wall having a central opening formed therein, a partly spherical flange surrounding said opening and being adapted to contact one of the curved bearing aligning surfaces of said bearing member, said second housing member including a wall portion disposed substantially parallel to the front wall of said first housing member, said wall portion having a central aperture formed therein, a laterally extending partly spherical flange surrounding said aperture and being adapted to contact the other spaced external curved bearing aligning surface of said bearing member, and means for connecting said second housing member to said first housing member.

14. A housing for a bearing member provided with spaced, curved, external bearing aligning surfaces comprising a pair of housing members for enclosing said bearing member, one of said housing members including a flange portion and a laterally extending box-like housing portion provided with an end wall, said end wall having an opening therein, a curved flange surrounding said opening and being adapted to contact one of the curved bearing aligning surfaces of said bearing member, said box-like portion having slots in its side walls, the other of said housing members having an aperture registering with said opening in the end wall of said first housing member, a laterally extending curved flange surrounding said aperture and being adapted to contact the other spaced external curved bearing aligning surface of said bearing member, and projecting tongues formed on said second housing member and adapted to lie in the slots of said box-like portion whereby to hold said housing members in assembled position.

15. A housing for a bearing member provided with spaced curved external bearing aligning surfaces comprising a pair of housing members for enclosing said bearing member, one of said housing members including a flange portion and integral laterally extending box-like housing portion provided with an integral end wall, said end wall having a central opening formed therein, a curved flange surrounding said opening and being adapted to contact one of the curved bearing aligning surfaces of said bearing member, said laterally projecting box-like portion having opposed pairs of slots in its side walls, the other of said housing members having a central aperture registering with said central opening in the end wall of said first housing member, a laterally extending curved flange surrounding said central aperture and being adapted to contact the other of said spaced external curved bearing aligning surfaces of said bearing member, and projecting tongues formed on said second housing member and adapted to lie in the slots of said box-like portion whereby to hold said housing members in assembled position.

16. A housing for a bearing member provided with spaced, partly spherical external bearing aligning surfaces comprising a pair of sheet metal housing members for enclosing said bearing member, one of said housing members including a flange portion and an integral laterally extending box-like housing portion provided with an integral end wall, said end wall having a central opening formed therein, a partly spherical flange surrounding said opening and being adapted to contact one of the spherical bearing aligning surfaces of said bearing member, said laterally projecting box-like portion having opposed pairs of slots in its side walls, the other of said housing members having a central aperture registering with said central opening in the end wall of said first housing member, a laterally extending partly spherical flange surrounding said central aperture and being adapted to contact the other of said spaced external spherical bearing aligning surfaces of said bearing member, projecting tongues formed on said second housing member and adapted to lie in the slots of said box-like portion, and means for holding said housing members in assembled relation with the spherical flanges thereof contacting the spherical bearing aligning surfaces of the bearing member therebetween while permitting said bearing member to align itself with respect to said assembled housing members.

17. A housing for a bearing member provided with spaced, curved, external bearing aligning surfaces comprising a pair of housing members for enclosing said bearing member, one of said housing members including a substantially cylindrical portion and a laterally and outwardly projecting flange formed on one end of said cylindrical portion, an end wall formed on the other end of said cylindrical portion disposed substantially parallel to said flange and having an opening therein, a curved flange surrounding said opening and being adapted to contact one of the curved bearing aligning surfaces of said bearing member, the other of said housing members including a substantially cylindrical portion adapted telescopically to fit within said first cylindrical portion and a laterally and outwardly extending flange formed on said second cylindrical portion, said last mentioned flange being adapted to lie in juxtaposed position against said first mentioned flange, an end wall formed at the other end of said second cylindrical portion and having an aperture formed therein, a curved flange surrounding said aperture and being adapted to contact the other of said spaced external curved bearing aligning surfaces of said bearing member, and means to hold said housing members in telescoping assembled position about said bearing member with the curved flanges thereof contacting the curved bearing aligning surfaces of the bearing member while permitting said bearing member to align itself with respect to said assembled housing members.

18. A housing for a bearing member provided with spaced, partly spherical, external bearing aligned surfaces comprising a pair of sheet metal housing members for enclosing said bearing member, one of said housing members including a substantially cylindrical portion and a laterally and outwardly projecting rectangular flange formed integral with one end of said cylindrical portion, and a wall formed integral with the other end of said cylindrical portion and disposed substantially parallel to said flange, said end wall having a central opening formed therein, a partly spherical flange surrounding said opening and being adapted to contact one of the partly spherical bearing aligning surfaces of said bearing member, the other of said housing members including a substantially cylindrical portion adapted telescopically to fit within said first cylindrical portion and a laterally and outwardly extending rectangular flange formed integrally with said second cylindrical portion, said last mentioned flange being adapted to lie in juxtaposed position against said first mentioned flange, an end wall formed on the other end of said second cylindrical portion and having a central aperture formed therein, a partly spherical flange surrounding said aperture and being adapted to contact the other of said partly spherical bearing aligning surfaces of said bearing member, and means to hold said housing members in telescoping assembled position about said bearing member with the partly spherical flanges thereof contacting the partly spherical bearing aligning surfaces of the bearing member while permitting said bearing member to align itself with respect to said assembled housing members.

19. A housing for a bearing member provided with spaced, curved, external bearing aligning surfaces comprising a pair of sheet metal housing members for enclosing the bearing member, one of said housing members comprising a box-like housing being open in the back having a front wall, said front wall having a bearing opening centrally thereof, said front wall having a forwardly extending flange, the inner surface of said forwardly extending flange being curved in cross section and contactingly overlying one of the bearing aligning surfaces of the bearing member, the other of said housing members comprising a sheet metal plate closing the rear of said box-like structure and having a similarly formed registering opening and a similarly formed flange extending rearwardly and engaging the other external bearing aligning surface whereby to permit alignment of said bearing member with respect to said housing member, and means for detachably interconnecting said housing members.

20. A housing for a bearing member having spaced, curved, external bearing aligning surfaces comprising a pair of sheet metal housing members, each of said housing members including an outstanding flanged portion and having a laterally extending portion, one of said laterally extending portions telescoping within the laterally extending portion of the other housing member with the flanged portions of the housing members lying one against the other, said laterally extending portions having registering openings to permit opposite ends of the bearing member to project therethrough, each of said openings being bordered by a curved flange whereby said curved flanges are maintained in spaced relation in overlapping contacting position on the spaced, curved external bearing aligning surfaces of the bearing member, and means for interconnecting said flanged portions of said housing members to maintain the same in assembled relation with the bearing member therebetween.

ROBERT H. WHITELEY.

REFERENCES CITED

The following references are of record in the file of this patent:

UNITED STATES PATENTS

| Number | Name | Date |
|---|---|---|
| 1,606,747 | Carter | Nov. 16, 1926 |
| 1,873,086 | Watts | Aug. 23, 1932 |
| 1,934,527 | Dodge | Nov. 7, 1933 |
| 1,946,086 | Lyman | Feb. 6, 1934 |
| 2,123,872 | Whiteley | July 19, 1938 |
| 2,258,040 | Young | Oct. 7, 1941 |
| 2,270,663 | Searles | Jan. 20, 1942 |
| 2,350,854 | Whiteley | June 6, 1944 |